United States Patent Office 3,096,983
Patented July 9, 1963

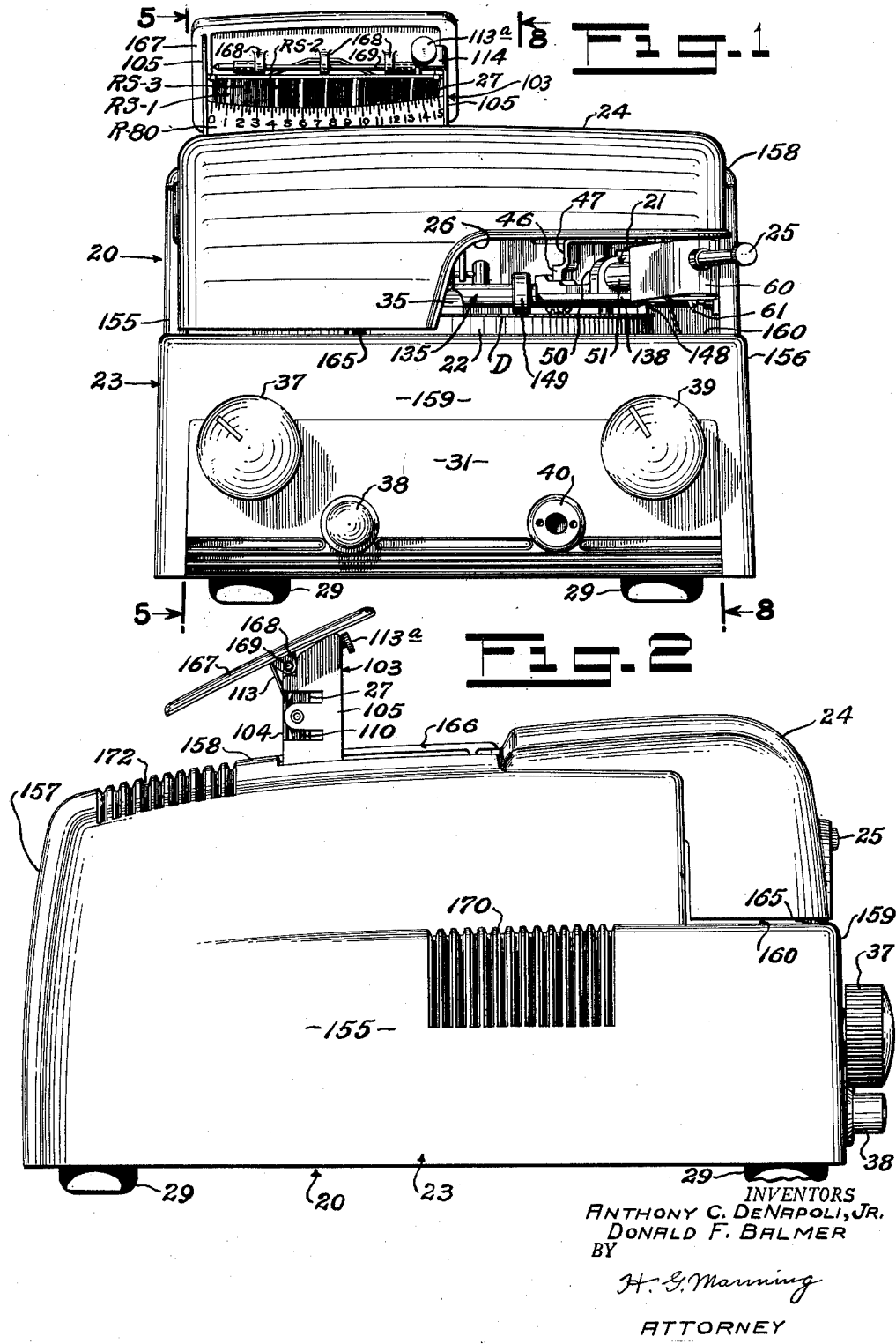

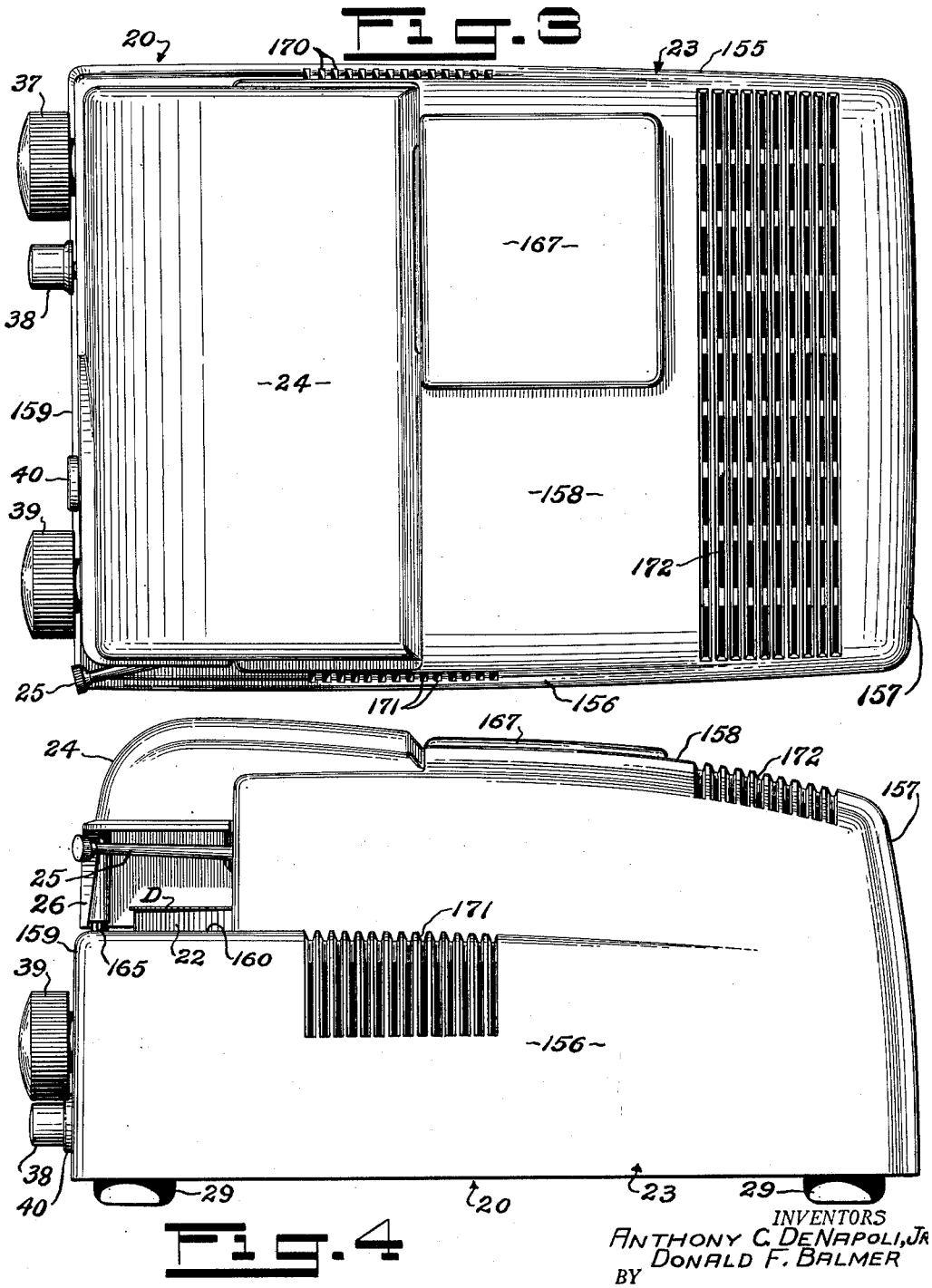

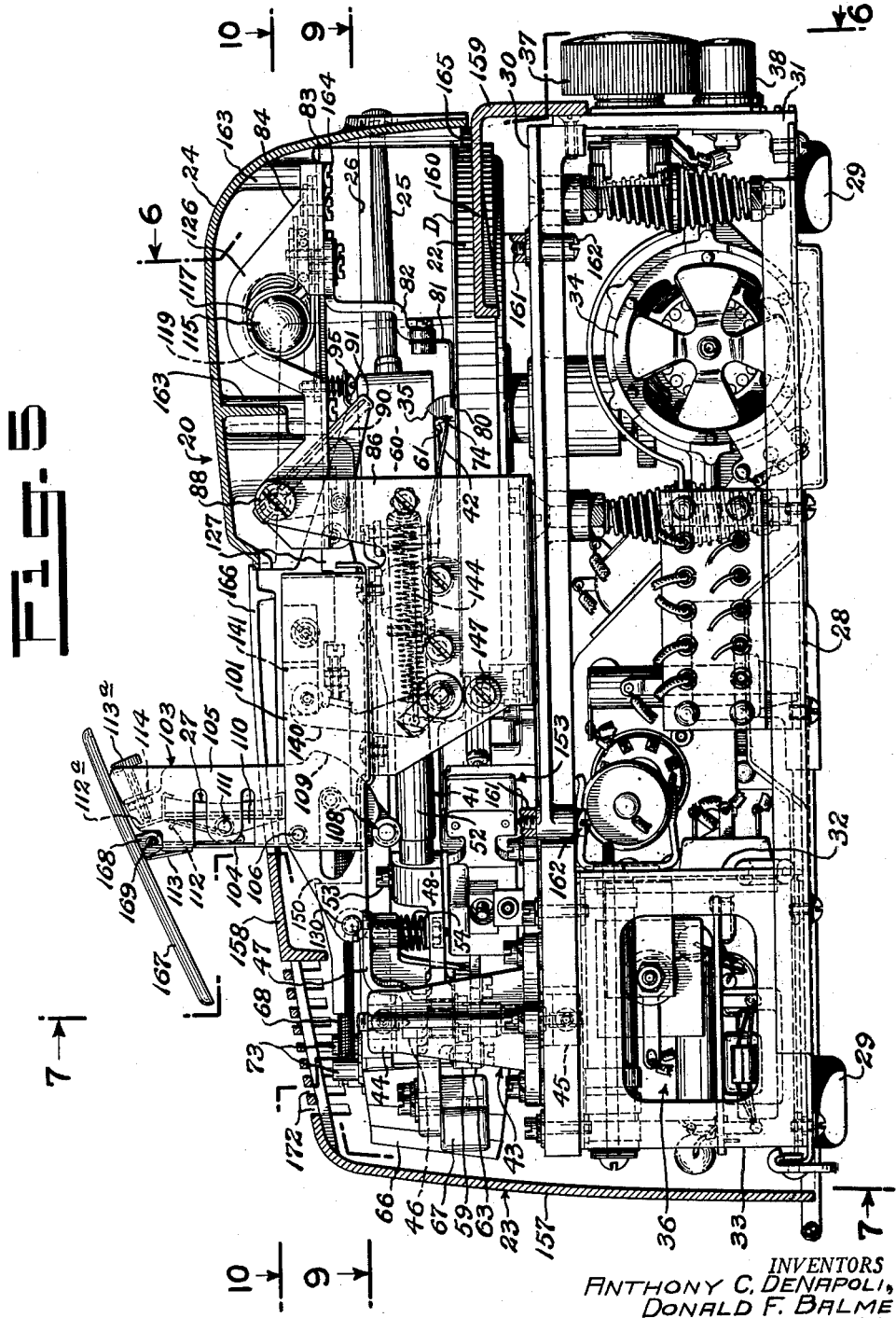

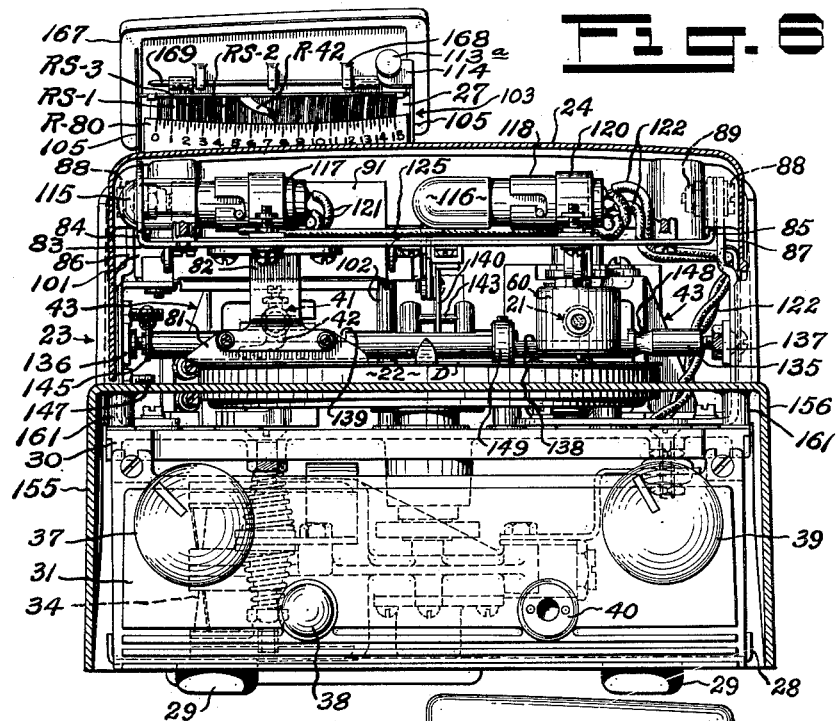
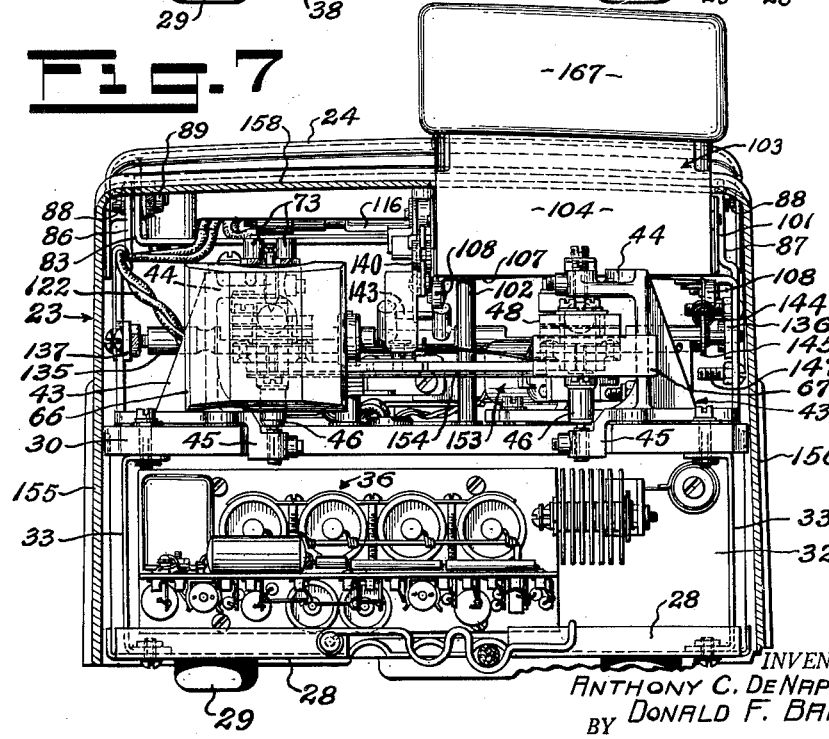

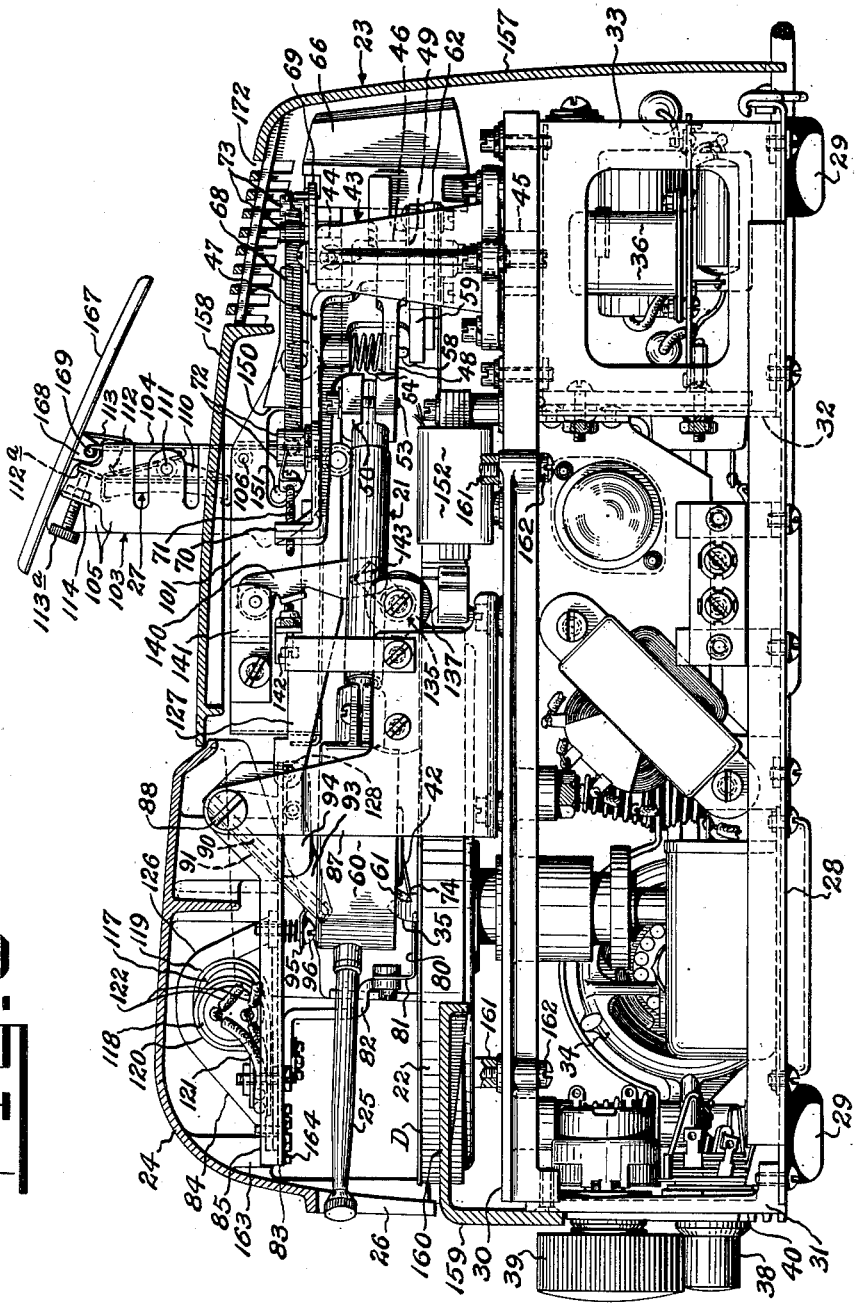

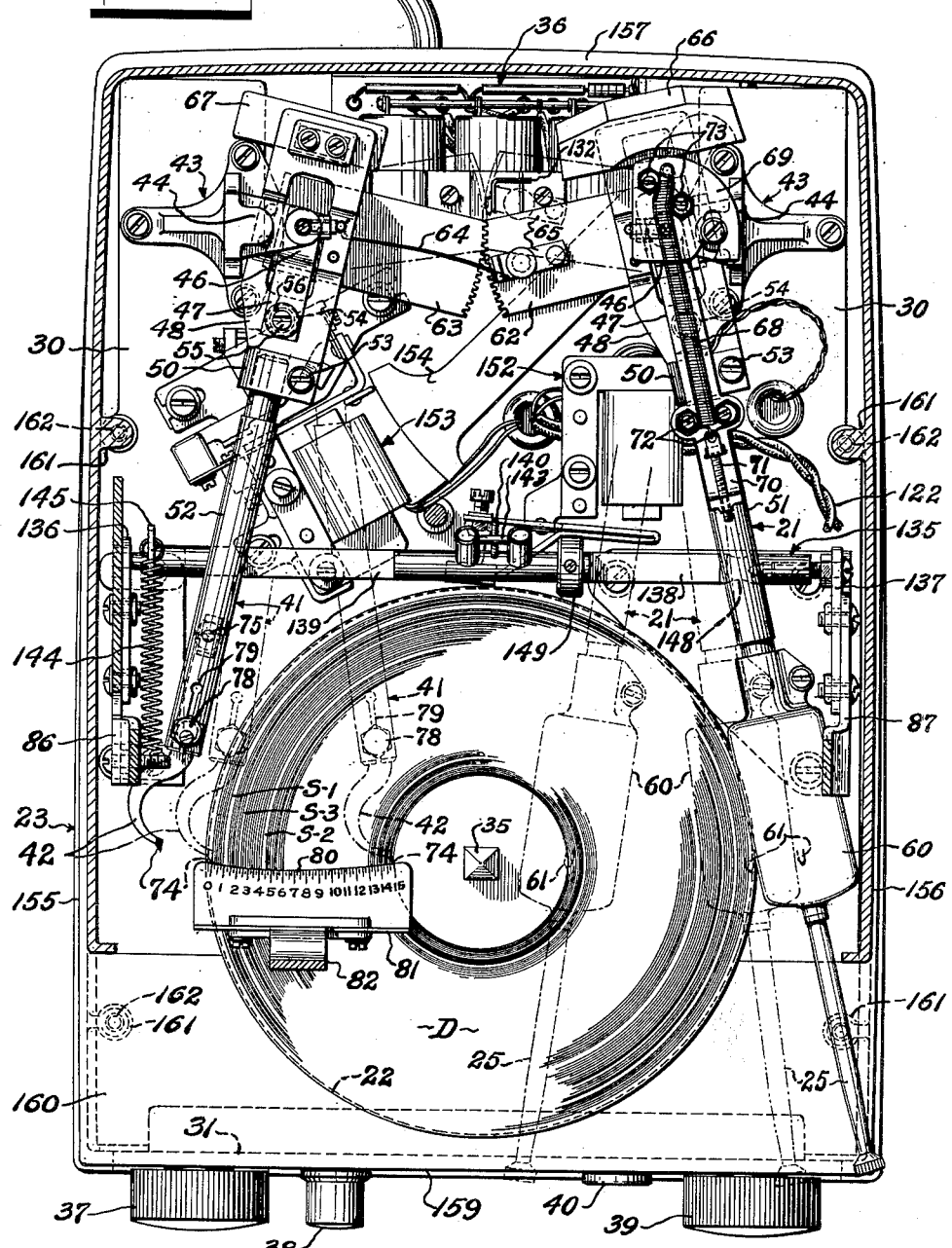

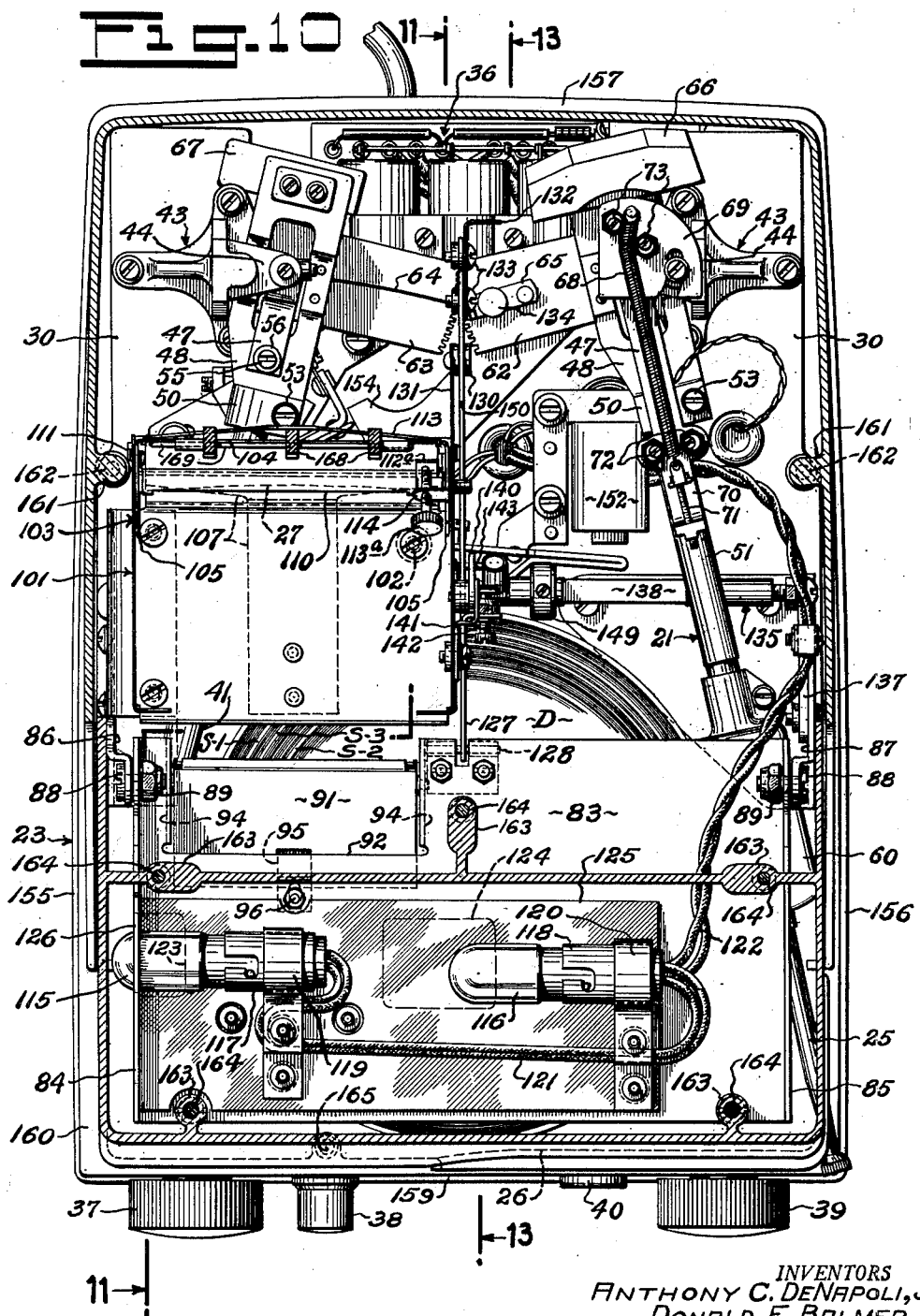

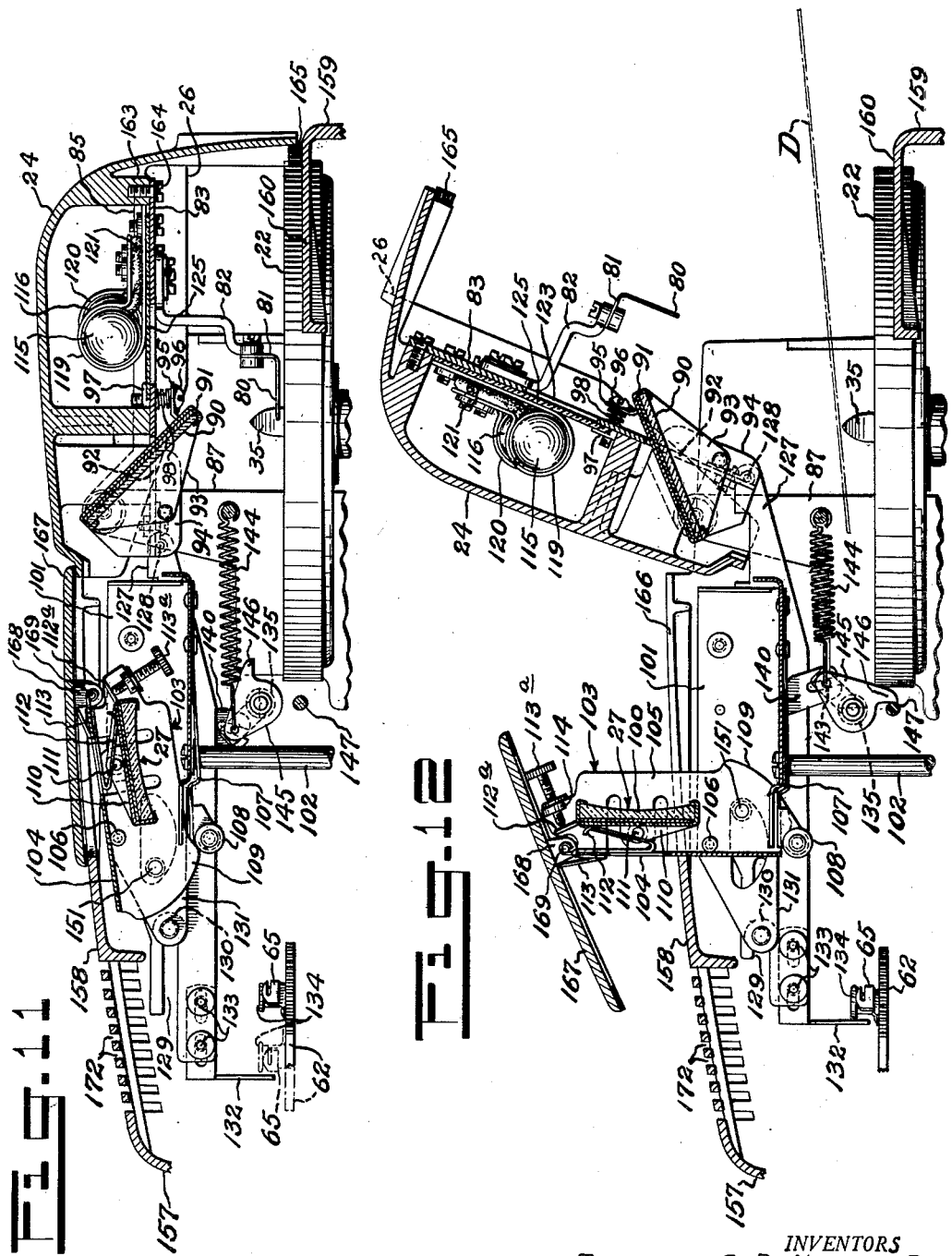

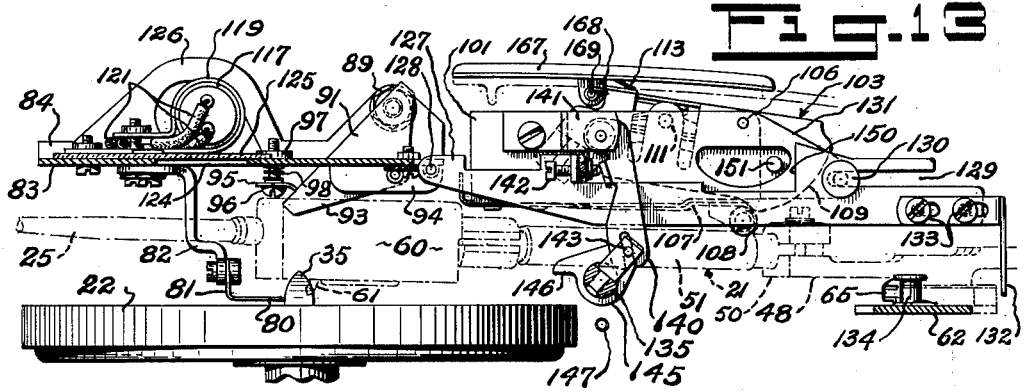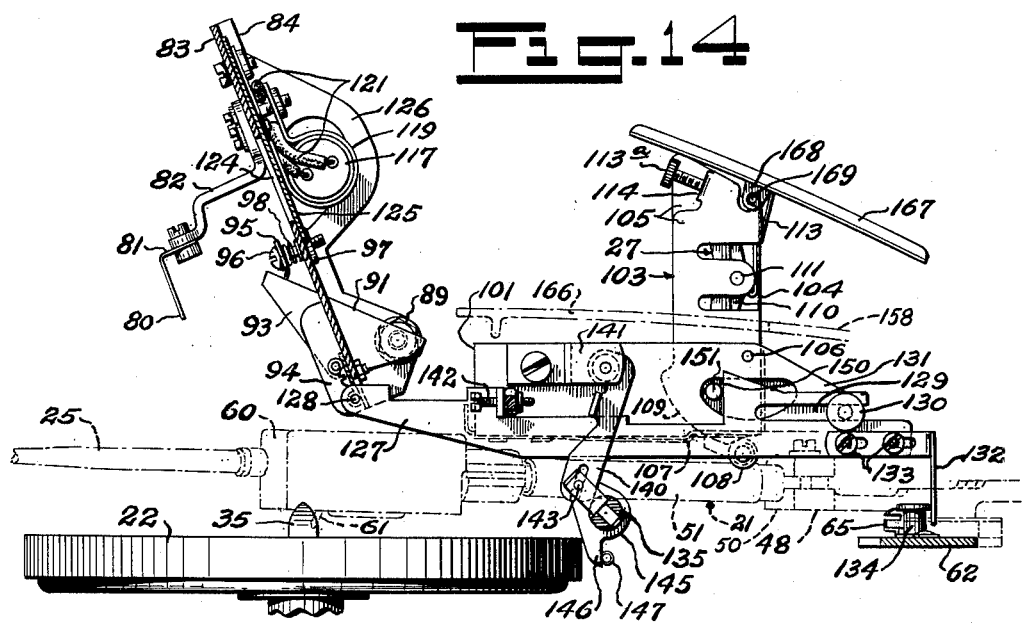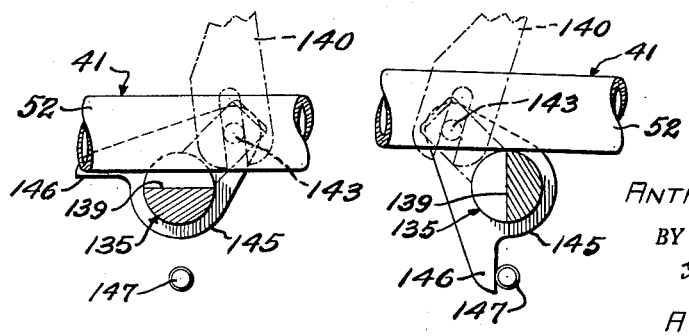

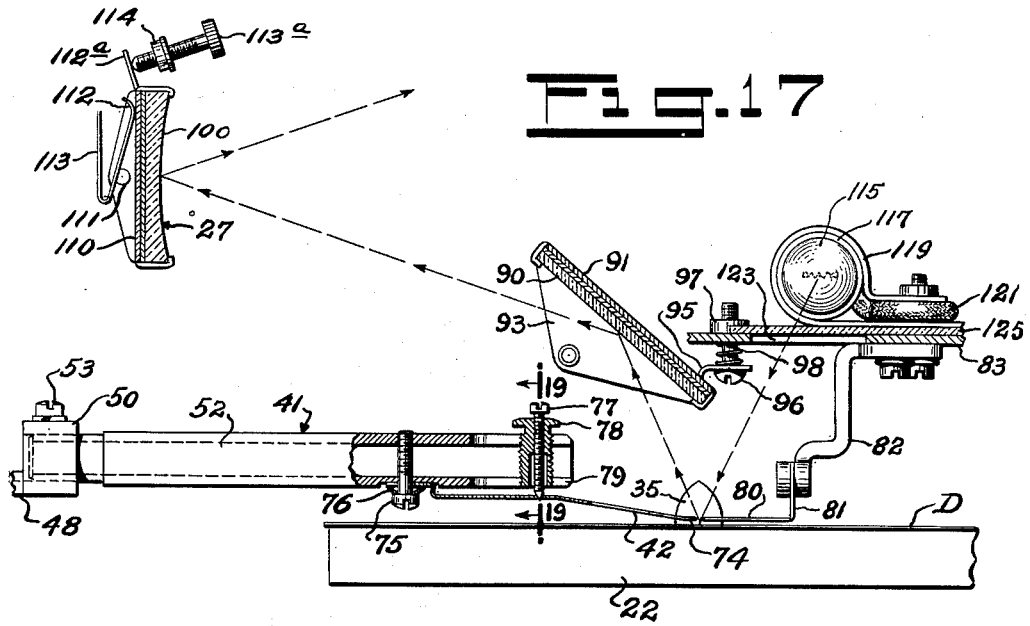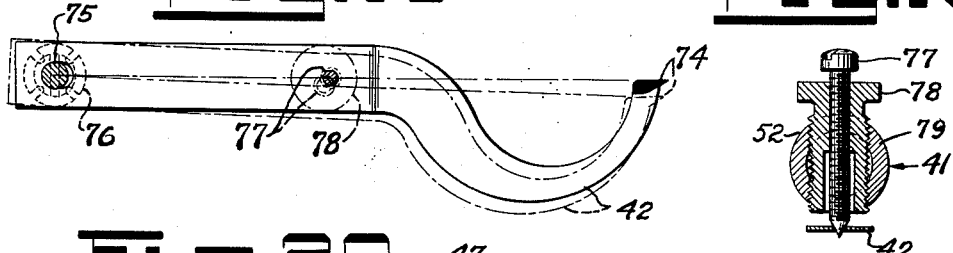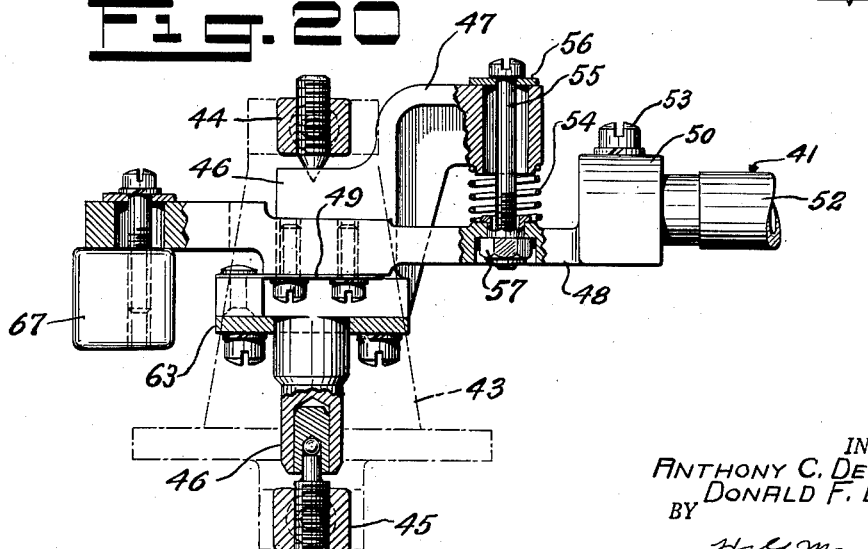

3,096,983
INDICATING AND PLACE-FINDING APPARATUS FOR PHONOGRAPHIC MACHINES
Anthony C. de Napoli, Jr., Windsor, and Donald F. Balmer, Madison, Conn., assignors to The Soundscriber Corporation, New Haven, Conn., a corporation of Connecticut
Filed Apr. 26, 1950, Ser. No. 158,104
14 Claims. (Cl. 274—9)

This invention relates to indicating and place-finding apparatus for phonographic machines of the type having a stylus-carrying arm or carriage for playing back or reproducing a sound track which has been impressed in the form of a spiral groove in a record member.

More particularly, the invention relates to an optical apparatus which is particularly adapted for use in phonographic transcribing machines, and which will permit the operator to interpret and utilize indexing marks and data upon the record member by visual observation of the record member while it is in operation in the machine, and without stopping it or referring to any auxiliary index sheets or strips.

The indexing marks or data which have been applied to the record member may be of any suitable type, such as pencil or crayon marks, and may also be in the form of relatively wide blank index spaces which have been provided between turns of the spiral groove at the desired locations on the record member.

One way in which such index spaces may be formed is described in the copending application of Frank E. Runge, entitled "Record Markers for Dictating Machines," Serial Number 45,952, filed August 24, 1948, Patent No. 2,611,620, dated September 16, 1952, which discloses a device whereby the operator of a dictating machine may provide a record disk with blank index spaces of various predetermined widths which will convey information to the transcribing typist according to a pre-arranged code, and across which the record groove is continued in a broadened spiral. Thus, a blank index space of one width may be used to indicate a point of correction which must be noted by the typist, while a wider blank space may indicate the end of a letter, and a still wider blank space may indicate the beginning of a "rush" letter or of special orally recorded instructions.

Although the device of the above-mentioned Runge application relieved the operator of the dictating machine of the necessity for providing and using separate index strips, the transcribing typist was still required to fill out an index strip in order to translate the index marks upon a record member into a form which would enable her to locate the transcribing stylus accurately in the desired positions upon the record member.

Accordingly, one object of this invention is to provide an indicating apparatus whereby the transcribing typist may obtain the necessary indexing information from a record member visually without requiring that any separate index strips be provided by either the dictator or the typist.

Another object of this invention is to provide an indicating apparatus which will render the mutual relationship of the stylus, the grooves, and the index marks on a record member in the machine clearly apparent to the operator at all times.

A further object is to provide an apparatus of the above nature having a stationary scale which is disposed in proximity to the grooved surface of the record member, and which is clearly visible to the operator, whereby the grooves and the index marks may be compared directly with the scale.

Another object of the invention is to provide an apparatus of the above nature in which the location of the stylus will be indicated by the position of an index pointer with relation to the scale.

Another object is to provide an apparatus of the above nature in which the image of the record member as observed by the operator will be magnified and reflected or projected whereby the locations of the index marks and of the pointer with relation thereto may be determined with greater accuracy.

Another object is to provide an apparatus of the above nature in which the record image appears in an elevated position in which it may be readily observed by the operator.

Another object is to provide an apparatus of the above nature which has coordinated mechanism for retracting the pointer so as to permit the record member to be applied to and removed from the machine.

Another object is to provide an apparatus of the above nature having a free-acting mechanism for producing reverse movements of the pointer as compared with movements of the stylus-carrying arm, whereby the arm and the pointer may operate over the surface of a record disk in paths situated at opposite sides of the center thereof.

Another object is to provide an apparatus of the above nature in which the operator, from his normal working position, will have a clear field of view of the scale, the pointer, and a sector of the record disk, and in which all parts of the apparatus which are not in said field of view will be substantially concealed.

A further object is to provide an apparatus of the above nature which will be relatively simple in construction, inexpensive to manufacture, easy to manipulate, compact, ornamental in appearance, not likely to deviate from its proper adjustment, and very efficient and durable in use.

With these and other objects in view, there has been illustrated on the accompanying drawing one form in which the invention may conveniently be embodied in practice.

In the drawing,

FIG. 1 is a front view of a phonographic transcribing machine embodying the improved indicating apparatus, showing the machine cover closed, and the mirror cover and the spherical upper mirror in erect operating position.

FIG. 2 is a left-hand side view of the same.

FIG. 3 is a plan view of the same, showing the mirror cover in closed position.

FIG. 4 is a right-hand side view of the same.

FIG. 5 is a longitudinal sectional view of the machine taken on the line 5—5 of FIG. 1.

FIG. 6 is a partial cross-sectional view of the machine taken on the broken line 6—6 of FIG. 5, and showing the stylus-carrying arm and the indicating pointer as they would appear when swung part way across the recorded portion of a record disk.

FIG. 7 is a cross-sectional view of a rear portion of the machine taken on the broken line 7—7 of FIG. 5.

FIG. 8 is a longitudinal sectional view of the machine as it would appear when viewed from the broken line 8—8 of FIG. 1.

FIG. 9 is a cross-sectional plan view of the machine, taken on the line 9—9 of FIG. 5, showing the stylus-carrying arm and the indicating arm in retracted position and also showing operating positions of said arms in broken lines.

FIG. 10 is a cross-sectional plan view of the machine, taken on the line 10—10 of FIG. 5, showing the means for illuminating the scale and the record member.

FIG. 11 is a longitudinal sectional view of an upper portion of the machine taken approximately at the location of the line 11—11 in FIG. 10, showing the mirrors as they would appear when the covers are closed.

FIG. 12 is a longitudinal sectional view similar to FIG. 11, but showing the spherical upper mirror in operating position, and also showing the machine cover in open position to permit the insertion of a record disk, as indicated in broken lines.

FIG. 13 is a partial longitudinal sectional view, taken approximately at the location of the broken line 13—13 of FIG. 10, showing a portion of the apparatus as it would appear when both of the covers are in closed position, and indicating the positions of the stylus-carrying arm and a portion of the cabinet in dotted lines.

FIG. 14 is a partial longitudinal sectional view similar to FIG. 13, but showing the parts as they would appear when the covers are open and the spherical mirror is in erect operating position.

FIG. 15 is a fragmentary sectional view, showing the relationship of the arm lifting mechanism to the indicator arm when the latter is in operating position.

FIG. 16 is a fragmentary cross-sectional view similar to FIG. 15, but showing the parts as they would appear when the indicator and stylus carrying arms are raised to lift the pointer and separate the stylus from the record member.

FIG. 17 is a fragmentary longitudinal sectional view illustrating the operation of the optical system, and also showing the adjustable construction of the indicator arm.

FIG. 18 is a plan view on an enlarged scale, partly in section, showing the indicator arm pointer, and also showing in broken lines a different adjusted position of said pointer.

FIG. 19 is a vertical sectional view taken on the line 19—19 of FIG. 17, but on a larger scale.

FIG. 20 is a side view on an enlarged scale, partly in section, illustrating the construction of the pivotal arm mountings, and specifically showing the indicator arm mounting.

Referring now to the drawings, in which like reference numerals denote corresponding parts throughout the several views, the numeral 20 indicates a phonographic transcribing machine which has the improved indicating and place-finding apparatus incorporated therein, and which is of the type having a stylus-carrying play-back arm or carriage 21 adapted to swing horizontally over a record disk D on a horizontal record support or turntable 22.

A major portion of the transcribing machine 20 is enclosed by a cabinet 23 and a cover 24 at the front thereof, the latter being upwardly swingable so as to permit the operator to have access to the turntable 22. Manual operation of the playback arm 21 is facilitated by a handle 25 which extends forwardly through a wide notch 26 in the lower front edge of the cover 24.

Visual indexing and place finding is afforded the operator by means comprising a mirror 27 (to be further described hereinafter) which is normally located in an upstanding position at the top of the machine 20 rearwardly of the swingable cover 24. The base of the transcribing machine 20 is provided by a bottom plate 28 which has a plurality of resilient feet 29, and which forms a closure at the bottom of the cabinet 23.

In order to support a horizontal motor board 30 at an intermediate level in the machine 20, the bottom plate 28 has a vertical front panel 31 attached thereto, and also has a vertical sheet metal shield 32 which forms a transverse partition rearwardly of the center of the machine 20, and which comprises a pair of side wings 33 extending substantially to the rear edge of the bottom plate 28. Thus, it will be seen that the bottom plate 28, the motor board 30, the front panel 31, and the transverse shield 32 form a box-like enclosure and provide forward and rearward compartments which are adapted to contain suitable apparatus for controlling and operating the playback arm 21 and the turntable 22.

Such apparatus preferably includes a motor 34 for driving a vertical spindle 35 which is journaled in the motor board 30 and supports the turntable 22 about said motor board, and a suitable amplifier 36. The front panel 31 supports manually operable knobs 37, 38, 39 for controlling the transcribing machine 20, and also has a jack 40 for the connection of a speaker or earphones.

As will be seen by reference to FIG. 9, for example, the playback arm 21 is mounted for horizontal swinging movement about a vertical axis which is located adjacent the rear of the transcribing machine 20, and to the right of the center thereof.

At the left of the center line of the machine 20, provision is made of an indicator arm 41 mounted for horizontal swinging movement about a vertical axis which is located the same distance from the turntable spindle 35, as is the axis of the playback arm 21. The indicator arm 41 is provided at its forward end with a crescent shaped pointer 42 adapted to serve as an index upon the record disk D.

*Playback and Indicator Arm Mountings*

The playback arm 21 and the indicator arm 41 are mounted upon the motor board 30 by separate means which are similar, excepting as hereinafter noted, each of said mounting means comprising a stanchion 43 having opposed upper and lower pivot carrying arms 44, 45, as best seen in FIGS. 7 and 20.

The pivot-carrying arms 44, 45 of the respective stanchions 43 support respective horizontally swingable brackets 46, 46, having upwardly offset forward extending arms 47, 47. Each of the swingable brackets 46 is freely embraced by a centrally apertured cradle 48 which is vertically swingable with respect to said bracket and connected thereto by means of flat hinge springs 49 (FIG. 20). The front ends of the cradles 48 are provided with horizontal sockets 50 in which forwardly-extending tubular portions 51, 52 of the respective playback and indicator arms 21 and 41 are adapted to be clamped by means of screws 53.

In order to urge the playback and indicator arms 21, 41 downwardly toward the motor board 30, provision is made of coil compression springs 54 (FIGS. 5, 8, and 20) which are engaged between the respective bracket arms 47 and forward portions of the cradles 48. Downward movement of the indicator arm 41 is limited, however, by a headed stop screw 55 which is engaged through a washer 56 on the top of the indicator bracket arm 47 and which extends freely downward through a large aperture in said bracket arm and through the coil spring 54 and the cradle 48, being secured below said cradle by a nut 57 (FIG. 20).

Downward movement of the playback arm 21 is similarly limited by a stop screw 58 (FIG. 8) which is held in the cradle 48 of the playback arm mounting, and which is adapted to engage a short forwardly extending lower arm 59 integral with the playback arm bracket 46. The stop screws 55 and 58 are so adjusted as to support the indicator arm 41 and the playback arm 21 at a predetermined operating level with respect to the disk D, while permitting said arms to be lifted away from said disk in a manner to be described hereinafter.

It will be understood that the playback arm 21 comprises a suitable playback head 60 which is firmly secured to the forward end of the tubular arm portion 51, and which carries a stylus 61 and the forwardly-extending handle 25.

In order to constrain the indicator arm 41 to equal horizontal swinging movements with the playback arm 21, provision is made of a pair of gear sectors 62, 63 fixed to the swingable brackets 46 of the respective arm mountings, said sectors being of equal radii and intermeshing upon the forward and rearward center line of the machine. Backlash between said gear sectors is eliminated by means of a wire spring arm 64 which is fixed to the gear sector 63 adjacent the mounting of the indicator arm, and which extends radially into engagement at the pitch line of said sectors with a clip 65 on the gear sector 62.

The playback and indicator arms 21 and 41 are counterbalanced by means of weights 66, 67, which are attached to the rear ends of their respective cradles 48, 48, these weights being so proportioned as to substantially neutralize the effects of horizontal shocks to which the transcribing machine 20 may be subjected during operation, and which would otherwise tend to shift the stylus 61 with respect to the record grooves. The counter weights 66, 67, are also located and proportioned in such a manner as to balance the weight of the arms 21, 41 in a vertical direction, so that said arms will operate properly even though the machine 20 may not be level, or may be subjected to vertical shocks.

In view of the foregoing, it will be seen that the playback and indicator arms 21, 41 will swing in unison toward and away from the center of the disk D, and that said arms are so mounted that resistance to such swinging movement will be negligible and will permit the stylus 61 to easily follow a spiral groove in the disk D.

However, in order to compensate for lateral forces which act upon the stylus 61 in following the record groove, provision is made of an elongated coil spring 68 which exerts a small inward bias upon the playback arm 21.

The rear end of the biasing spring 68 is anchored to an adjustable plate 69 mounted upon the playback arm stanchion 43, and the front end of said spring is anchored to a forward extension 70 of the playback bracket arm 46 by means of a screw 71, said screw being adjustable so as to vary the tension of said spring. The direction in which the force of the biasing spring 68 is exerted is accurately controlled by means of a pair of posts 72 which are mounted upon the forward arm extension 70 so as to closely embrace said spring, and a pair of posts 73 which are similarly mounted upon the adjustable plate 69. The posts 73 are eccentrically located with respect to the vertical axis of the playback arm 21, so that rotary adjustment of the plate 69 may vary the lateral location of the rear end of the spring 68.

*Indicator Arm Construction*

In order to insure that the indicator arm 41 will indicate precisely the same turn of the record groove with which the playback stylus 61 is engaged, the pointer 42 is provided with a sharp, forwardly-directed tip 74 (FIGS. 9, 17, and 18) which is disposed closely adjacent the surface of the record disk D, and which is so located as to be equidistant, with the stylus 61, from the respective axes of swinging movement. The tip 74 is preferably of a color contrasting with the color of said disk, so as to increase its visibility.

The rear end of the pointer 42 is attached to the bottom of the tubular arm portion 52 by means of a headed screw 75 having a spring washer 76, and an intermediate portion of said pointer is provided with a small aperture which is engaged by the lower pointed end of a vertical screw 77.

The screw 77 is mounted in an eccentrically tapped bushing 78 which is externally threaded and frictionally held in a vertically slotted resilient front end section 79 of the tubular arm portion 52. It will, therefore, be seen that the vertical screw 77 may be turned in order to flex the pointer 42 and thus locate the tip 74 at the desired level closely adjacent the disk D, while the bushing 78 may be turned so as to adjust the pointer 42 in a horizontal direction, as indicated by dotted lines in FIG. 18, and thus bring the pointer tip 74 into accurate register with the proper turn of the groove to be indicated.

*Scale*

The operator may at times wish to gauge the widths of grooved portions of the disk D or the location of the indexing marks thereon. Further, in some instances the person who has recorded the disk may have provided a separate log sheet made out according to a log scale on the recording machine, in which case it may be necessary for the operator of the transcribing machine 20 to refer to a scale therein in order to interpret the log sheet correctly.

Accordingly, provision is made of an arcuate scale 80 which is formed approximately on the radius of the indicator arm 41 and which is disposed closely adjacent the path of the pointer tip 74.

Further, the scale 80 is disposed in a lateral position across the recordable portion of the disk D and close to the surface thereof, so that direct comparison of the scale marks with the grooves and index marks on the record disk may be made. Still further, said scale will tend to press downwardly and correct the position of any disk D which may be warped or which may have been improperly placed upon the turntable 22.

The scale 80 comprises a forward upturned flange 81 which is attached by means of an offset, T-shaped bracket 82 to the lower surface of a cover plate 83 which normally overlies the turntable 22 in a horizontal position. The cover plate 83 comprises a pair of upturned reinforcing side flanges 84, 85 (FIG. 10) which are swingably connected to the upper ends of left and right-hand cover brackets 86, 87 upon the motor board 30, by means of pivot screws and nuts 88, 89. By means of this construction, the cover plate 83 may be swung upwardly so as to raise the scale 80 and to afford easy access to the turntable 22, as will be further described hereinafter.

*Opical System*

In order to permit the operator to conveniently observe the scale 80, the pointer 42, and a sector of the record disk D adjacent thereto, provision is made of means which includes the upper mirror 27 and which will project an image of said scale, pointer, and sector upwardly to the top of the machine 20, and then forwardly so as to bring said image into an approximately horizontal or slightly inclined line of sight which is readily adjustable according to the wishes of the machine operator. The image of the scale and the pointer, as seen in the mirror 27, are indicated in the drawing (FIGS. 1 and 6) as R80 and R42, respectively.

The aforesaid image projecting means further comprises a flat rectangular mirror 90 which is carried in a holder 91 in an inclined position above the forward end of the indicator arm 41. The holder 91 is mounted in a rectangular notch 92 in the rear edge of the cover plate 83 by means of a pair of downturned flanges 93 at opposite ends of said holder, said flanges having trunnions engaged in a pair of flanges 94 on the cover plate 83. The lower edge of the holder 91 is provided with a forwardly-extending apertured ear 95, through which is engaged a headed screw 96 held by a nut 97 above the cover plate 83, provision also being made of a coil spring 98 engaged between said ear and said cover plate and loosely embracing said screw.

The flat mirror 90 will reflect an image of the scale 80, the pointer 42, and the adjacent disk area in an upward and rearward direction, the inclination of which may be adjusted by turning the screw 96 so as to tilt the mirror holder 91.

As indicated in FIG. 17, the upper mirror 27 is located, when in operating condition, in an upstanding forwardly facing position rearwardly of the flat mirror 90 so as to render the image reflected by said flat mirror easily visible to the operator.

Further, the upper mirror 27 preferably has a concave reflecting surface 100 of spherical curvature, so that the image which is apparent to the operator will be magnified and the relationship of the pointer 42 to the disk markings and to the scale 80 may be readily seen.

The upper mirror 27 is mounted by means which will permit said mirror to be folded downwardly into the machine 20 when not in use, said means comprising an opentopped rectangular mirror case 101 which is attached at its left-hand side to a rearward extension of the left hand cover bracket 86, and which is supported at its right hand side by a post 102 on the motor board 30.

Provision is made of a vertically swingable sheet metal mirror frame 103 comprising a flat back wall 104 and a pair of forwardly-extending side walls 105 which are pivotally supported between upper rear portions of the side walls of the mirror case 101 by means of outwardly extending trunnions 106.

It will be seen that when the mirror frame 103 is swung forwardly and downwardly about the trunnions 106, said mirror frame will be received within the mirror case 101 so as to form an enclosure for the upper mirror 27. When the mirror frame 103 is swung upwardly, a lower edge portion of the back wall 104 will engage the rear edge of the bottom wall of the mirror case 101, so as to define an erect operating position of said mirror frame 103.

In order to hold the mirror frame 103 selectively in erect or folded positions, provision is made of a T-shaped leaf spring 107 which is secured against the lower surface of the mirror case 101, and which carries a pair of rollers 108 in the planes of the respective side walls 105 of the mirror frame 103.

The T-shaped spring 107 presses the rollers 108 upwardly against arcuate lower edges 109 of the side walls 105, said arcuate lower edges extending downwardly through slots in the bottom of the mirror case 101 and being so proportioned that the rollers 108 may ride upwardly at the ends of said edges when the mirror frame 103 approaches its erect and folded positions, whereby said rollers will serve as double-acting detents for holding said mirror frame selectively in said positions.

The upper mirror 27 is carried in a rectangular holder 110 which is supported for limited vertical swinging movement between the side walls 105 of the mirror frame 103 by means of a pair of trunnions 111 engaged in said side walls. The upper mirror holder 110 tends to swing downwardly under the influence of a reversely bent end 112 of a wire spring 113 which is hooked over the upper edge of the back mirror frame wall 104, and which has another function to be described hereinafter.

However, the upper mirror 27 is held against swinging by an upwardly-extending ear 112a which is engaged by a thumb screw 113a mounted in a tapped lug 114 on the upper end of the right-hand side wall 105 of the mirror frame. Thus, it will be seen that the line of sight by which the operator may observe the record image may be swingably adjusted in a vertical direction by turning the thumb screw 113a.

*Indicator Illuminating Means*

In order to illuminate the scale 80, the pointer 42, and the adjacent surface of the record disk D, provision is made of a pair of electric lamps 115, 116 (FIG. 10) mounted in respective sockets 117, 118, which are attached to the upper surface of the cover plate 83 by means of a pair of clamping straps 119, 120, said sockets having pairs of suitable lead wires 121, 12 for connecting said lamps to a suitable source of electric current.

The cover plate 83 is formed with window openings 123, 124 to permit the downward passage of light from the lamps 115, 116, and a translucent diffusing screen 125 of suitable plastic sheet material is preferably secured over said window openings beneath the clamps 119, 120, so as to produce a more or less uniform illumination of the area of the disk D adjacent the scale 80.

It will be noted, however, that the lamps 115, 116, and the window openings 123, 124 are located in positions which are laterally offset with respect to the scale 80 and the field of view which is provided by the mirrors 90, and 27, so that the mirrors will receive no direct reflection of the sources of illumination from the scale or the polished surface of the record disk D. However, grooved surface portions of the disk D will catch and diffuse the light from the lamps 115, 116, so that such grooved portions will appear relatively bright as compared with the disk D when viewed by means of the mirrors 90 and 27. Consequently, index spaces such as the spaces S–1, S–2, and S–3 on the disk D will reflect a relatively small amount of light and will appear in the upper mirror 27 as images RS–1, RS–2, and RS–3, respectively (FIGS. 1 and 6).

Inasmuch as a pair of the electric lamps 115, 116 is provided, failure of one of said lamps will not incapacitate the machine or the optical apparatus, and the operator may continue to use the machine until such time as the defective lamp may be replaced. The machine may, in fact, be so constructed as to utilize a single lamp, although it is preferable to provide a pair of lamps in order to secure a more uniform illumination of the disk surface.

In view of the foregoing, it will be seen that the improved indicating apparatus will permit the operator of the machine to clearly see and distinguish index spaces from recorded areas of the disk while the latter is in operation in the machine, and said index spaces may be seen and utilized whether or not the record groove extends across them in a broadened spiral.

Inasmuch as the left-hand electric lamp 115 is located in such a position that it projects beyond the adjacent edge of the cover plate 83, the continuity of the cover plate reinforcing flange 84 is preserved by an upwardly-extending loop portion 126 which provides clearance for said lamp and bridges the outer end of the window opening 123.

*Arm Retracting Mechanism*

The transcribing machine 20 is provided with mechanism for retracting the indicator arm 41 and the playback arm 21 to inactive positions at the opposite sides of the machine, so as to facilitate the insertion of the record disc D and the removal of said disk from the turntable 22, said mechanism comprising a horizontal draw bar 127 connected to a central rear edge portion of the cover plate 83 by a hinge having a pin 128.

The draw bar 127 extends rearwardly approximately on the center line of the transcribing machine 20 and is supported at its rear end by means of a longitudinal slot 129 which slidably receives a stud 130 mounted on a triangular rearward extension 131 of the mirror case 101, as shown in FIGS. 13, and 14. The rear end of the draw bar 127 is provided with a depending spring arm 132 which is adjustably attached thereto by means of a pair of screws 133, and which is adapted to engage an upstanding stud 134 on the gear sector 62. The spring arm 132 is so located as to push the stud 134 forwardly when the draw bar 127 is moved forwardly by upward swinging movement of the cover plate 83, thus swinging the gear sectors 62, 63, and moving the playback and indicator arms 21, 41 to their outer positions, as shown in FIG. 9.

The retracting mechanism also comprises a lifting shaft 135 which is located in a transverse position below the playback and indicator arms 21, 41, and which is journaled at its ends in a pair of bearing plates 136, 137, mounted on the respective cover brackets 86, 87.

When the playback and indicator arms 21, 41 are in operating position over the record disk D, the tubular portions 51, 52 of said arms are freely swingagle above reduced cam sections 138, 139 formed by cutting portions of the lifting shaft 135 away diametrically, as illustrated, for example, in FIGS. 9, 15, and 16.

When the cover plate 83 is closed and the machine is in normal operating condition, the lifting shaft 135 will be held in inactive position (FIGS. 9, 13, and 15) by a forked actuator lever 140, which is swingably mounted on the upper mirror case 101 by means of a bracket 141, and which is adapted to be engaged by an adjustable screw 142 carried by the draw bar 127. The lower end of the forked actuator lever 140 is engaged with a horizontal pin 143 which is eccentrically mounted upon a central portion of the lifting shaft 135, whereby swinging movement of said lever is adapted to rotate said shaft.

When the actuator lever 140 is released by a forward movement of the draw bar 127, the lifting shaft 135 will be rotated forwardly so as to lift the playback and indicator arms 21, 41 upon the respective reduced sections 138, 139, as shown in FIG. 16, such rotation of the shaft 135 being performed by a coil spring 144 (FIGS. 9, 11, and 12), which is anchored to the lefthand cover bracket 86, and which is connected to an operating crank 145 upon the lifting shaft 135. The forward rotation of the lifting shaft 135 is limited, however, by a nose 146 which is formed on the crank 145 and which is adapted to engage a stop screw 147 in the cover bracket 86.

It will be understood that the screw 142 and the depending spring arm 132 on the draw bar 127 will be so adjusted that, when the draw bar 127 is slid forwardly, the screw 142 will release the actuator lever 140 before the spring arm 132 engages the stud 134, whereby the lifter-operating spring 144 will cause the playback and indicator arms 21, 41 to be lifted away from the record disk D prior to outward swinging movement of said arms. The operation of the retracting mechanism will, of course, be attended by raising of the scale 80 from the turntable 22, so that the disk D on the turntable will be fully accessible to the operator.

The lifting shaft 135 preferably is formed with an annular groove 148 outwardly of the reduced section 138 for receiving and releasably retaining the playback arm 21 in its outermost inactive position (FIG. 9).

If desired, a stop ring 149 may be secured to the lifting shaft 135 inwardly of the reduced section 138 so as to limit inward swinging movement of the playback arm 21 and also the indicator arm 41 which is operatively connected thereto.

Opening movement of the cover plate 83 is also adapted to swing the upper mirror 27 upwardly into operating position, if said mirror has previously been folded downwardly into the mirror case 101, this operation being accomplished by means of an upstanding abutment 150 (FIGS. 13 and 14) which is formed on the draw bar 127 and which is adapted to engage a stud 151 on the mirror frame 103.

The stud 151 projects outwardly from the right-hand side wall 105 of said mirror frame below the trunnion 106, the adjacent side wall of the mirror case 101 being slotted as to permit swinging movement of said stud.

The transcribing machine 20 may be provided with any suitable adjuncts for producing the most efficient operation, such as a brake device 152 which is adapted to operate upon the turntable 22, and a stepback device 153 for producing a step-by-step reverse movement of the playback arm 21. The stepback device 153 may be operatively connected to the arm 21 by means of a sector plate 154 which is attached to the playback arm bracket 46 below the gear sector 62.

Cabinet and Cover Construction

The cabinet 23 is so constructed as to have a generally rectangular shape, and comprises approximately vertical side walls 155, 156, a back wall 157, and a top wall 158. The cabinet 23 also has a front wall portion 159 which is complementary with the front panel 31 in enclosing the lower front of the machine 20, and a horizontal front shelf 160 which embraces a forward portion of the turntable 22 and overlies the motor board 30.

In order to secure the cabinet 23, said cabinet is provided with tapped vertical inner lugs 161 which are clamped against the upper surface of the motor board 30 by means of a plurality of screws 162.

Similarly, the cover 24 is attached to the cover plate 83 by means of a plurality of tapped inner lugs 163 held by screws 164. The lower front edge of the cover 24 is provided with a resilient bumper 165 which determines the closed position of said cover and the cover plate 83. The scale 80, and the flat mirror 90 are, of course, so adjusted as to occupy their proper operating positions when the bumper 165 rests upon the front shelf 160.

In order to accommodate the upper mirror 27 and its frame 103, the top wall 158 of the cabinet 23 is provided with a rectangular opening 166. When the upper mirror and the frame 103 are folded downwardly into the mirror case 101, the rectangular opening 166 will be closed by a small mirror cover 167 which is pivotally attached to an upper portion of the mirror frame 103 by means of a plurality of lugs 168 and a pivot pin 169. When the mirror frame 103 is in upper operating position, the mirror cover 167 will be held in such a position as to partially shield the upper mirror 27, this position of the cover 167 being maintained by an upwardly bent portion of the wire spring 113 which is in engagement therewith behind the lugs 168. When the mirror frame 103 is swung downwardly into the case 101, the spring 113 will yield so as to permit the cover 167 to seat uniformly upon the top cabinet wall 158 around the edges of the opening 166.

In order to provide ventilation for the interior of the transcribing machine 20, the cabinet side walls 155, 156 preferably have grilles 170, 171, and the rear portion of the top wall 158 is formed with a grille 172.

Operation

When the transcribing machine 20 is in operating condition, the operator may insert a record disk D merely by raising the machine cover 24 and lowering said disk vertically upon the turntable 22 so that the central aperture of the disk receives the spindle 35.

Assuming that the upper mirror 27 has been folded downwardly into the mirror case 101 after the previous use of the machine, the step of opening the cover 24 will automatically raise the mirror frame 103 to erect operating position where it will be held by the action of the T-shaped spring 107 and the rollers 108. The cover 24 may now be swung downwardly to closed position, in which the record disk D will be substantially enclosed and the scale 80 will be located closely adjacent the disk D and the indicating pointer 42.

The operator may then grasp the playback arm handle 25, place the stylus 61 in the groove at the desired starting point upon the disk D, and start the machine into operation.

The location of the stylus 61 will, of course, be clearly indicated to the operator by the position of the reflected image R–42 of the pointer 42 as seen in the upper mirror 27. If desired by the operator, she may turn the mirror adjusting thumb screw 113a so as to adjust the upper mirror 27 to her eye level in the location in which she may be sitting, thus affording a clear field of view which includes the entire scale 80, the indicating pointer 42, and an adjacent area of the disk D which extends entirely across the recordable portion or zone thereof.

Inasmuch as the scale 80 will preferably have been so marked as to indicate elapsed machine operating time in minutes at the normal speed of operation, the transcribing operator may readily estimate in advance the lengths of letters which have been recorded on the disk D merely by observing the positions of marks which have been placed upon said disk at the ends of letters. As shown, for example, in FIG. 9, the index spaces S–1 and S–2 are relatively wide and serve as marks which indicate the ends of letters, and which are clearly visible to the operator in the upper mirror 27 so that their positions with reference to the scale 80 and to the pointer 42 may be easily determined.

A relatively narrow blank index space S–3 upon the disk D will forewarn the operator of the presence of a correction which must be made in the recorded material, and which will enable the operator to locate and play back the correction recorded following said narrow blank space S–3 as a step preliminary to making a complete transcription of the letter which may be recorded between the wide index spaces S-1, S-2.

In view of the foregoing, it will be seen that the indicating apparatus herein disclosed will permit the operator to obtain the necessary indexing information from index spaces or other marks on the disk D, taken either alone or in conjunction with instructions which may be orally recorded on said disk adjacent said marks, and that separate index strips may be entirely dispensed with.

Further, it will be understood that index spaces such as the blank spaces S-1, S-2, and S-3 may serve to indicate predetermined points in a continuous recording, inasmuch as the record groove may extend continuously in a broadened spiral across said spaces, as described in the patent of Frank E. Runge, hereinbefore referred to. Thus, the improved indicating apparatus may, if desired, serve to point out various themes in a continuously recorded musical or other composition which may be played back without interruption by said index spaces.

While the present invention will permit index strips to be eliminated, it will be seen that the provision of the scale 80 will also permit such strips to be used if desired by the operator.

The operator will at all times have a clear view of a sector of the record surface and the pointer 42, so that any doubt as to the condition of said surface or as to the position of the stylus 61 will be avoided. If, for example, the machine 20 ceases to play back during operation thereof, the operator may instantly determine, by looking at the upper mirror 27, whether the stylus 61 has reached a blank space in the record surface, or whether the stylus is still following a portion of the groove which may contain no recording, and the operator may govern his actions accordingly.

When the operator wishes to remove the disk D from the machine 20, he will raise the cover 24, thus causing simultaneous retraction of the playback and indicator arms 21, 41 away from the turntable 22, and automatically lifting the scale 80 so that the disk D may be readily removed. When the playback arm 21 is retracted, the tubular portion 51 thereof will enter the annular groove 148 of the lifting shaft 135, where it will be retained until the operator grasps the handle 25 and moves the arm 21 inwardly.

When the operator discontinues the use of the machine 20, he may fold the upper mirror 27 into the mirror case 101 by pressing the mirror cover 167 downwardly until it seats upon the top cabinet wall 158, thus excluding dust from the mirror 27 and other parts of the machine while the machine is not in use.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to Secure Letters Patent, is:

1. In a phonographic transcribing machine having a cabinet, a support for rotatably holding a record member, an inclined mirror mounted above said support for reflecting an image of said record rearwardly and upwardly, an adjustable mirror in said cabinet reflecting said image forwardly out of said cabinet into a position to be visible to the transcribing typist, said adjustable mirror being retractable downwardly into inoperative position within said cabinet.

2. In a phonographic transcribing machine, a turntable having a center spindle for supporting an apertured record disk having spiral recorded grooves and indicating sections thereon, a playback stylus carrying arm, means for moving said arm across said turntable at one side of the spindle thereof, a pointer carrying arm movable across said turntable at the other side of the spindle thereof, said pointer being located closely adjacent said record, and intermeshing gears on said stylus carrying arm and said pointer arm for constraining said pointer to indicate the exact turn of the spiral groove in which said stylus is engaged.

3. The invention as defined in claim 2, in which said stylus carrying arm and said pointer arm are both pivotally mounted on vertical axes, said arms both being provided with counter weights at their rear ends for minimizing the effects of shocks to which the machine may be subjected and serving to oppose forces of gravity tending to swing said arms laterally when said machine is in off-level position.

4. The invention as defined in claim 2, in which said arms have intermeshing gear segments, and a spring on one of said segments and connected to the other segment for preventing backlash therebetween.

5. In a phonograph transcribing machine, a cabinet enclosing a turntable having a central spindle for rotatably holding a record member, a carriage holding a stylus engaging said record, means movably mounting said carriage and stylus with respect to said record, said cabinet comprising a cover located above said turnable and swingable to expose a portion of said turntable, a lamp in said cover for illuminating said record, and a mirror for reflecting rearwardly and upwardly an image of a portion of said record member to a location above said cabinet, and an adjustable manually depressible mirror located within said cabinet in the path of the reflection from said first mirror.

6. The invention as defined in claim 5, having means for retracting said stylus carriage outwardly toward the edge of said turntable, and means to connect said retracting means to said cover for causing said retracting means to be actuated by the opening movement of said cover.

7. In a phonographic transcribing machine, a cabinet having a cover hinged thereto, a support having a central spindle for rotatably holding a disk record provided with a central aperture and having recorded spiral sound grooves and index marks formed thereon, an arm carrying a stylus engaging said grooves, means for mounting said arm for movement in a path extending across said disk record, an upwardly retractable scale disposed closely adjacent said disk and extending across the grooved portion thereof, a mirror for projecting an image of said scale and the adjacent area of said disk into a line of sight offset from said record which is visible to the transcribing typist so as to permit her to see and gauge the positions of said index marks with reference to said scale and causing the contrast between the grooved and ungrooved portions of said disk to be increased, means for raising said scale upwardly away from said record disk to permit the removal of said disk from its support, an indicating pointer adjacent said scale and disk record, means mounting said pointer for movement in a path across said record and located on the other side of said spindle from said stylus, and intermeshing gears on said stylus arm and said pointer for constraining said pointer to accurately indicate the turn with which said stylus is engaged.

8. In a phonograph transcribing machine, a cabinet enclosing a turntable having a central spindle for rotatably holding a record member, a carriage holding a stylus engaging said record, means movably mounting said carriage and stylus with respect to said record, said cabinet comprising a cover located above said turntable and swingable to expose a portion of said turntable, a lamp in said cover for illuminating said record, a mirror for reflecting rearwardly and upwardly an image of a portion of said record member to a location above said cabinet, an adjustable manually depressible mirror located within said cabinet in the path of the reflection from said first mirror, said adjustable mirror being arranged to project above the top of said cover when the machine is in use, means for manually depressing said adjustable mirror into a position within said cabinet when not in use, and mechanism operatively connecting said cover to said mirror for moving said adjustable mirror to erect operating position when said cover is opened.

9. In a phonographic transcribing machine, a support having a central spindle for rotatably holding a record member having spiral sound grooves and indicating sections recorded thereon, a carriage having a stylus, means movably mounting said carriage to cause said stylus to engage and follow said grooves at one lateral side of said spindle, a movable scale disposed closely adjacent and extending across the turns of said grooves at the other side of said spindle from said stylus, an indicating pointer adjacent said scale, mechanism interconnecting said pointer and said carriage moving means operative to move said pointer with respect to said scale and toward the center of said record member in proportion to the distance moved by said stylus toward the center of said record upon movement of said carriage, and mirror means for reflecting the image of said scale and indicating pointer and the adjacent area of said record into a line of sight above the machine which is visible to the operator so that he may readily see the positions of said grooves and indicating sections and gauge the position of said stylus with reference to said scale, said scale being pivotally mounted for upward movement away from said record member to permit the removal of the latter from said support.

10. The invention as defined in claim 9, in which said indicating pointer is removably mounted in a vertical direction above said scale, and wherein said interconnecting mechanism comprises a pair of intermeshed toothed segments cooperative about individual spaced vertical axes.

11. The invention as defined in claim 9, having a lamp which illuminates the top of said scale and the adjacent area of said record member, said lamp being located in offset relationship to said area and to said mirror means to avoid direct reflection of said lamp from said area and thus increase the contrast between the grooved and ungrooved portions of said record member.

12. In a phonographic transcribing machine, a support having a central spindle for removably holding a disk record member having grooves recorded therein and having portions thereon which indicate the locations of corrections and ends of recorded sections, a stylus carrying carriage mounted above said record for swinging movement across one lateral side thereof, an indicating pointer closely adjacent said record member, means for mounting said pointer for movement laterally across the turns of said grooves at the other lateral side of the spindle from said stylus, intermeshing means connecting said pointer and said carriage for constraining said pointer to indicate at the other lateral side of said spindle from said stylus the exact turn with which said stylus is engaged, and mirror means above said indicating pointer for projecting an image of said pointer and the adjacent area of said record into a line of sight offset from said record and visible to the transcribing typist, so that she may readily see the image of said pointer and thus gauge the relative position of said stylus with respect to said indicating portions.

13. In a phonographic transcribing machine, a cabinet having a hinged cover moveable between open and closed positions with respect thereto, a support having a central spindle for rotatably holding within said cabinet a disk record provided with a central aperture surrounding said spindle and having recorded spiral sound grooves and index marks formed thereon, an arm carrying a stylus for engaging said grooves at one side of said spindle, a pointer mounted for movement in a path extending across said disk record at the opposite lateral side thereof from said stylus, an upwardly retractable scale disposed closely adjacent said pointer and extending across the grooved portion thereof at the opposite lateral side thereof from said stylus, a mirror for projecting an image of said pointer, said scale, and the adjacent area of said disk record into a line of sight offset from said record which is visible to the transcribing typist so as to permit her to see and gauge the positions of said index marks with reference to said pointer and said scale and causing the contrast between the grooved and ungrooved portions of said disk record to be increased, and means interconnecting said cover and said scale for raising said scale upwardly away from said disk record upon movement of said cover to open position, to permit the removal of said disk from its support.

14. The invention as defined in claim 7, including mechanism connected to said scale, said pointer and said carriage for simultaneously retracting them away from said disk record when the cover of said machine is raised, whereby access to the disk record support will be facilitated to insert and remove disk records.

References Cited in the file of this patent

UNITED STATES PATENTS

| | | |
|---|---|---|
| 1,209,852 | Kotterman | Dec. 29, 1916 |
| 1,460,289 | Tota | June 26, 1923 |
| 1,517,690 | Abt | Dec. 2, 1924 |
| 1,630,939 | Guichard | May 31, 1927 |
| 1,658,030 | Adams | Feb. 7, 1928 |
| 1,688,824 | Miessner | Oct. 23, 1928 |
| 1,739,794 | Kent | Dec. 17, 1929 |
| 1,776,470 | Jones | Sept. 23, 1930 |
| 1,804,453 | Basseches | May 12, 1931 |
| 1,867,997 | Baruch | July 19, 1932 |
| 1,871,259 | Crowley | Aug. 9, 1932 |
| 1,930,544 | Victor | Oct. 17, 1933 |
| 1,933,057 | Harkin | Oct. 31, 1933 |
| 1,961,803 | Trout | June 5, 1934 |
| 2,138,875 | Meissner | Dec. 6, 1938 |
| 2,424,513 | Stephan | July 22, 1947 |
| 2,464,064 | Thompson | Mar. 8, 1949 |
| 2,466,338 | Traub | Apr. 5, 1949 |
| 2,475,744 | Harman | July 12, 1949 |
| 2,500,014 | Turner | Mar. 7, 1950 |
| 2,539,784 | Kleber | Jan. 30, 1951 |
| 2,552,757 | Adler | May 17, 1951 |
| 2,587,970 | Courtis | Mar. 4, 1952 |

FOREIGN PATENTS

| | | |
|---|---|---|
| 17,360 | France | Aug. 22, 1913 |
| 114,471 | Australia | Jan. 15, 1942 |